E. A. NELSON.
CRANK SHAFT AND BEARING THEREFOR.
APPLICATION FILED FEB. 5, 1910.

974,697.

Patented Nov. 1, 1910.

Witnesses
W. K. Ford
H. J. Belknap

Inventor
Emil A. Nelson
By Whittemore Hulbert & Whittemore
Attys

UNITED STATES PATENT OFFICE.

EMIL A. NELSON, OF DETROIT, MICHIGAN, ASSIGNOR TO ROTARY VALVE MOTOR COMPANY, OF DETROIT, MICHIGAN, A CORPORATION OF MICHIGAN.

CRANK-SHAFT AND BEARING THEREFOR.

974,697.  Specification of Letters Patent.  Patented Nov. 1, 1910.

Application filed February 5, 1910. Serial No. 542,192.

*To all whom it may concern:*

Be it known that I, EMIL A. NELSON, a citizen of the United States of America, residing at Detroit, in the county of Wayne and State of Michigan, have invented certain new and useful Improvements in Crank-Shafts and Bearings Therefor, of which the following is a specification, reference being had therein to the accompanying drawings.

The invention relates to engines, and more particularly to explosion engines, in which the crank shaft is inclosed in a crank casing.

It is the object of the invention to provide a construction of two-part crank shaft, which is provided with a central and friction bearing for engaging supporting bearings in the crank case, and the invention consists in the construction as hereinafter set forth.

Figure 1:
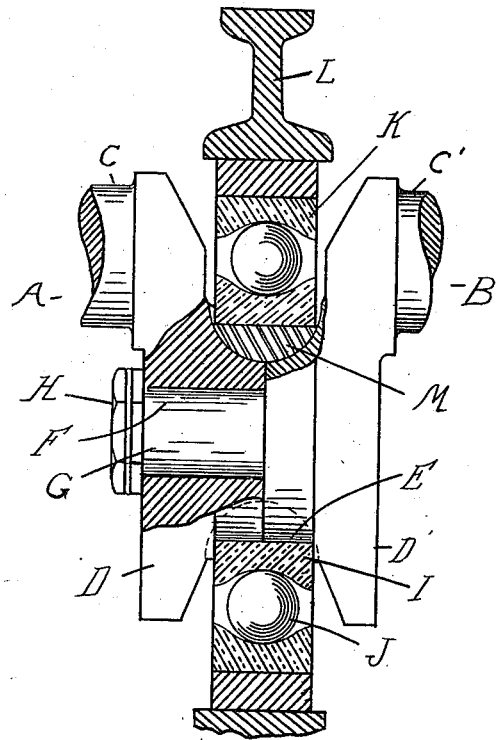
Figure 2:
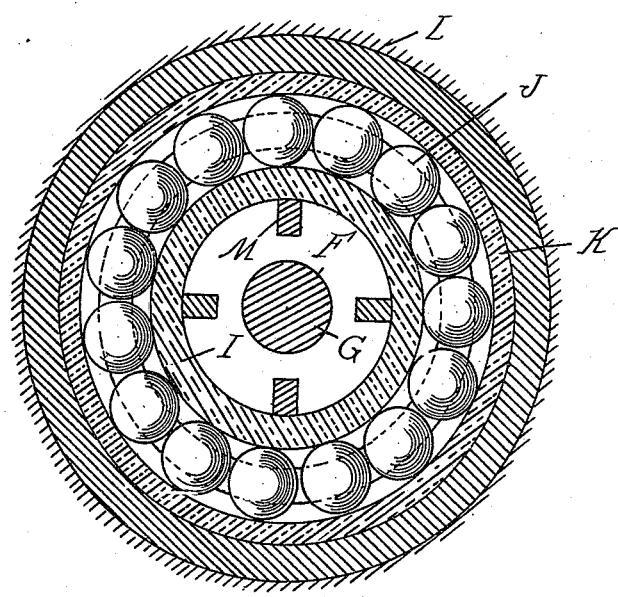

In the drawings—Figure 1 is a longitudinal section through the adjoining ends of the crank shaft sections and bearing; Fig. 2 is a cross section.

A and B are the two sections of the crank shaft, which are provided with adjacent alined cranks C and C'.

D and D' are the arms of the cranks at the adjoining ends, each of which is provided with a hub or boss E concentric with the axis of the shaft. One of these hubs E is centrally apertured at F, while the other hub is provided with a pin G for engaging said aperture and threaded at its outer end to engage a clamping nut H.

I is an annular recess for a ball bearing, which surrounds the adjoining hub E.

J are balls in the recess I, and K is an outer ball race, which peripherally fits a bearing L in the crank case, this bearing being of sufficient diameter to permit of the withdrawal of the crank therethrough. For locking the sections A and B to each other, and hold the cranks in alinement, keys are arranged to engage longitudinal key seats in the adjoining hub sections E, "woodruff" keys M being preferably employed. These are retained by the race I and when the nut H is clamped both sections of the crank are rigidly attached to each other.

What I claim as my invention is:

1. A crank shaft, formed in two sections having adjacent cranks abutting bosses on said cranks concentric with the axis of the shaft, a key engaging a radial key seat in said bosses, and a ball race surrounding said bosses and retaining said key.

2. A crank shaft comprising two sections having adjacent cranks, abutting bosses on said cranks concentric with the axis of the shaft, a pin projecting from one boss engaging a corresponding recess in the other, a key engaging a radial key seat in the periphery of said bosses, and a ball bearing mounted upon and surrounding said bosses forming a retaining means for said key.

3. A crank shaft comprising two sections having adjacent abutting bosses on said cranks concentric with the axis of the shaft, a pin projecting centrally from one of said bosses and passing through a corresponding aperture in the other boss, a clamping nut having a threaded engagement with the end of said pin, a key engaging a radial key seat in the periphery of said bosses, and a ball bearing mounted upon said bosses and retaining said key in its seat.

4. A crank shaft comprising two sections having adjacent cranks, abutting bosses on said cranks, a plurality of keys engaging radial recesses in the periphery of said bosses, and a ball bearing mounted upon said bosses and retaining said keys.

5. A crank shaft comprising two sections having adjacent cranks, abutting bosses on said crank concentric with the axis of the shaft, a plurality of segmental keys engaging corresponding key seats in the periphery of said bosses, and a ball bearing mounted on said bosses and retaining the same.

6. A crank shaft comprising two sections having adjacent cranks, abutting bosses on said cranks concentric with the axis of the shaft, a projecting portion on one of said bosses of lesser diameter than said bosses and engaging an aperture in the adjacent member, a plurality of segmental keys engaging corresponding key seats in the periphery of said bosses, and a ball bearing mounted upon said bosses and retaining said keys.

In testimony whereof I affix my signature in presence of two witnesses.

EMIL A. NELSON.

Witnesses:
W. J. BELKNAP,
NELLIE KINSELLA.